United States Patent
Zaks

(10) Patent No.: US 8,136,107 B2
(45) Date of Patent: Mar. 13, 2012

(54) SOFTWARE PIPELINING USING ONE OR MORE VECTOR REGISTERS

(75) Inventor: Ayal Zaks, Misgav (IL)

(73) Assignee: International Business Machines Corporation, Armonk, NY (US)

( * ) Notice: Subject to any disclaimer, the term of this patent is extended or adjusted under 35 U.S.C. 154(b) by 1131 days.

(21) Appl. No.: 11/877,675

(22) Filed: Oct. 24, 2007

(65) Prior Publication Data

US 2009/0113168 A1 Apr. 30, 2009

(51) Int. Cl.
*G06F 9/45* (2006.01)
*G06F 9/445* (2006.01)

(52) U.S. Cl. .................. 717/160; 717/149; 717/150

(58) Field of Classification Search .......... 717/148–155, 717/160–161
See application file for complete search history.

(56) References Cited

U.S. PATENT DOCUMENTS

| | | | | |
|---|---|---|---|---|
| 5,121,498 A * | 6/1992 | Gilbert et al. | ................. | 717/149 |
| 5,202,975 A * | 4/1993 | Rasbold et al. | ............... | 717/151 |
| 5,247,696 A * | 9/1993 | Booth | ........................... | 717/150 |
| 5,274,818 A * | 12/1993 | Vasilevsky et al. | ........... | 717/149 |
| 5,361,354 A * | 11/1994 | Greyzck | ........................ | 717/160 |
| 5,551,039 A * | 8/1996 | Weinberg et al. | ............. | 717/150 |
| 6,651,246 B1 * | 11/2003 | Archambault et al. | ....... | 717/160 |
| 6,742,110 B2 * | 5/2004 | Djafarian et al. | ............ | 712/215 |
| 6,941,548 B2 * | 9/2005 | Goodwin et al. | ............. | 717/151 |
| 6,954,927 B2 * | 10/2005 | Ostanevich | ................... | 717/160 |
| 7,313,788 B2 * | 12/2007 | Ben-David et al. | ........... | 717/150 |
| 7,376,940 B1 * | 5/2008 | Bush et al. | ..................... | 717/149 |
| 7,386,842 B2 * | 6/2008 | Eichenberger et al. | ....... | 717/150 |
| 7,395,531 B2 * | 7/2008 | Eichenberger et al. | ....... | 717/160 |
| 7,506,326 B2 * | 3/2009 | McIntosh | ....................... | 717/140 |
| 7,680,954 B2 * | 3/2010 | Zhang | ........................... | 709/245 |
| 7,681,187 B2 * | 3/2010 | Ludwig et al. | ................ | 717/151 |
| 7,747,989 B1 * | 6/2010 | Kissell | .......................... | 717/148 |
| 7,840,954 B2 * | 11/2010 | Gschwind | ..................... | 717/159 |

OTHER PUBLICATIONS

Lopez et al, "Parallel multiclass classification using SVMs on GPUs", ACM GPGPU, pp. 2-11, 2010.*
Yu et al, "Vector processing as a soft processor accelerator", ACM Trans. on Reconfig Tech. and Sys. vol. 2, article 12, pp. 1-34, 2009.*
Kitai et al, "Parallel processing architecture for Hitachi S 3800 shared memory vector multiprocessor", ACM ICS, pp. 288-297, 1993.*
Ibbett et al, "MU6V: A parallel vector processing system", IEEE, pp. 136-144, 1985.*
Hongbo Rong, Alban Douillet and Guang R. Gao, "Register Allocation for Software Pipelined Multi-dimensional Loops", Proceedings of the 2005 ACM SIGPLAN conference on Programming language design and implementation pp. 154-167, 2005.
Hiroya Itoga, Tomohiro Haraikawa, Yoshi yuki Yamashita, and Jiro Tanaka, "Register allocation for software pipelining with predication using spiral graph", Proceedings of the International Symposium on Future Software Technology (ISFST2001).

(Continued)

*Primary Examiner* — Anil Khatri
(74) *Attorney, Agent, or Firm* — Jason Far-Hadian

(57) ABSTRACT

A method for managing multiple values assigned to a variable during various stages of a software pipelined process executed in a computing environment. The method comprises allocating two or more slots in a vector register to two or more values associated with said variable during two or more stages of a pipeline process; and rotating values in each slot responsive to an instruction.

15 Claims, 5 Drawing Sheets

OTHER PUBLICATIONS

Sid-Ahmed-Ali Touati and Christine Eisenbeis, "Early Periodic Register Allocation on ILP Processors", Parallel Processing Letters, vol. 14, No. 2, Jun. 2004.

G. S. Tyson, M. Smelyanskiy and E. S. Davidson, "Evaluating the Use of Register Queues in Software Pipelined Loops", IEEE Transactions on Computer, vol. 50, No. 8 pp. 769-783, Aug. 2001.

Nakamura, H.; Imori, H.; Yamashita, Y.; Nakazawa, K.; Boku, T.; Li, H.; Nakata, I., "Evaluation of pseudo vector processor based on slide-windowed registers", System Sciences, 1994. vol. I: Architecture, Proceedings of the Twenty-Seventh Hawaii Internation Conference.

* cited by examiner (a)

MOVE SR2 TO SR1
MOVE SR3 TO SR2
MOVE SR4 TO SR3
COPY X5 TO SR4

(b)

MOVE SR2 TO SR1
MOVE SR3 TO SR2
MOVE SR4 TO SR3
COPY X6 TO SR4

(c)

SOFTWARE PIPELINING USING ONE OR MORE VECTOR REGISTERS

COPYRIGHT & TRADEMARK NOTICES

A portion of the disclosure of this patent document contains material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of third parties affiliated or unaffiliated with the applicant or the assignee. Use of these marks is for providing an enabling disclosure by way of example and shall not be construed to limit the scope of this invention to material associated with such marks.

FIELD OF INVENTION

The present invention relates generally to multiprocessing computing environments and, more particularly, to a system and method for using vector registers to store values associated with a variable during various software pipeline stages.

BACKGROUND

Software pipelining refers to a method for changing the order of instructions in a logical loop in a program code executed in a computing environment, to optimize the total execution process. The software pipelining method applies instruction scheduling techniques to efficiently overlap successive iterations of logical loops in the program code and execute them in parallel in a multiprocessing computing environment.

A software pipelining scheme may be used to execute series of instructions in the loop where possible in advance, while other series of instructions belonging to a previous phase of the pipeline are being concurrently executed. The pipelining allows for look-ahead processing of certain values for a future stage of the loop, while processing certain values for a current stage of the loop.

When a compiler software pipelines a loop, some variables typically need to be assigned to several distinct registers to initiate and support the pipelining process. Since values for a single variable (e.g., variable X) are being calculated concurrently by instructions at different stages of the loop, several registers (as opposed to a single register) need to be allocated to the same variable. The number of registers that are allocated to a variable may be determined in advance by reviewing the logic code for the loop.

Two problems may arise in software pipelining. First, the system may run out of available registers. Second, the need to access distinct registers explicitly requires inserting register copy instructions or unrolling of the loop, or specially designated hardware, which can be costly in terms of the associated overhead as provided in more detail below. For example, one method for managing and allocating the various registers is to use multiple scalar registers (e.g., 32-bit wide registers) to store the different values of a variable at different stages. If the value for a variable X is being concurrently calculated for various stages of the pipeline, then multiple scalar registers may be used to maintain the various values.

Referring to FIG. 1(a), for example, four scalar registers SR1 through SR4 are illustrated, wherein each scalar register is respectively allocated to hold one of the four values for variable X (i.e., X1, X2, X3, X4) at each stage of a pipeline.

In this example, since the loop may be executed more than four iterations, the four registers need to be updated in a rotating scheme, such that the oldest value is discarded from SR1 at each iteration and the value stored in the remaining registers (i.e., SR2, SR3 and SR4) is moved over to the next register.

Referring to FIG. 1(b), the value in SR2 is moved to SR1 thereby deleting the value X1, the value in SR3 is moved to SR2, the value in SR4 is moved to SR3, so that the last register SR4 is available for a newly calculated value for X (e.g., X5). As shown, X2, X3, X4, X5 represents the respective values for X as stored in registers SR1 through SR4, after the four separate instructions MOVE, MOVE, MOVE, and COPY are executed to shift and copy the respective values among the registers.

Referring to FIG. 1(c), another set of four separate instructions (i.e., MOVE, MOVE, MOVE, COPY) need to be executed to store the values for X in the next pipeline stage in registers SR1 through SR4. As shown, after said four separate instructions are executed, the values for X are shifted to the left by one to allow a new value X6 to be stored in SR4; oldest value for X (i.e., X2) is discarded to make the shift to the left possible.

Unfortunately, the above shifting scheme using series of scalar registers is undesirable. Such shifting scheme results in substantial overhead in memory management and execution resources since it requires maintaining multiple scalar registers for each value and multiple instructions will have to be executed for shifting/rotating the values among the registers at each iteration. Rotating register files may be implemented in hardware. However, not all processors support rotating register files in hardware, as it may not be cost-effective overall.

As such, the current schemes (e.g., loop unrolling and a hardware implementation of the rotating scheme) have drawbacks and disadvantages in that they either result in an increase in code size or a reduction in performance, or increased hardware complexity. Methods and systems are needed that can overcome the aforementioned shortcomings.

SUMMARY

The present disclosure is directed to systems, methods and corresponding products that facilitate software pipelining a loop.

For purposes of summarizing, certain aspects, advantages, and novel features of the invention have been described herein. It is to be understood that not all such advantages may be achieved in accordance with any one particular embodiment of the invention. Thus, the invention may be embodied or carried out in a manner that achieves or optimizes one advantage or group of advantages without achieving all advantages as may be taught or suggested herein.

In accordance with one embodiment, a method for a method for managing multiple values assigned to a variable during various stages of a software pipelined process executed in a computing environment is provided. The method comprises allocating two or more slots in a vector register to two or more values associated with said variable during two or more stages of a pipeline process; and rotating values in each slot responsive to an instruction.

Rotating the values comprises sequentially moving a value stored in a first slot to a second slot in the vector register. The first slot may be adjacent to the second slot. In some embodiments, a new value is stored in a slot of the vector register, when an old value in said slot is moved to another slot, in response to the rotating. Storing the new value in said slot and the rotating of values in each slot takes place responsive to a single instruction or a single execution cycle.

In accordance with one aspect of the invention, a system comprising one or more logic units is provided. The one or more logic units are configured to perform the functions and operations associated with the above-disclosed methods. In yet another embodiment, a computer program product comprising a computer useable medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The invention is not, however, limited to any particular embodiment disclosed.

BRIEF DESCRIPTION OF THE DRAWINGS

Embodiments of the present invention are understood by referring to the figures in the attached drawings, as provided below.

Features, elements, and aspects of the invention that are referenced by the same numerals in different figures represent the same, equivalent, or similar features, elements, or aspects, in accordance with one or more embodiments.

DETAILED DESCRIPTION OF EXEMPLARY EMBODIMENTS

The present disclosure is directed to systems and corresponding methods that facilitate software pipelining a loop in a code processing environment.

In the following, numerous specific details are set forth to provide a thorough description of various embodiments of the invention. Certain embodiments of the invention may be practiced without these specific details or with some variations in detail. In some instances, certain features are described in less detail so as not to obscure other aspects of the invention. The level of detail associated with each of the elements or features should not be construed to qualify the novelty or importance of one feature over the others.

In accordance with one embodiment, during a modulo scheduling process that software pipelines a loop, instances of an operation from successive iterations are scheduled with an initiation interval (II) of T cycles. The total schedule length l is defined as the execution time of one complete iteration. Each iteration may be composed of S=[l/T] number of stages, with each stage taking T cycles. Note that [ ] rounds up if l does not divide by T (also known as 'ceiling'). The schedule may comprise of three phases: the prolog to fill the pipeline, the kernel to be executed multiple times, and the epilog to drain the pipeline.

Figure 2:
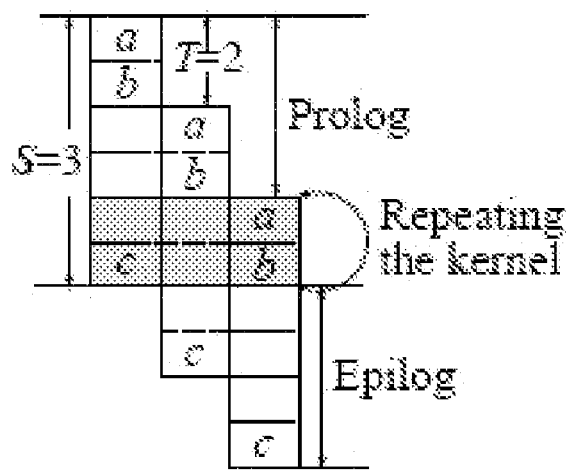
FIG. 2 is an exemplary representation of a single loop where a temporary name (TN) represents a variant for values calculated or a variable in a loop, in accordance with one embodiment.

FIG. 2(a) shows an example intermediate representation of a single loop, in accordance with one embodiment, where a temporary name (TN) represents a variant. If a TN value is used i iterations after where it is produced, it has a live-in distance equal to i. The TN value is annotated with the live-in distance. For example, TN{1} refers to the TN value defined in the previous loop iteration, with the live-in distance being 1. In an embodiment with two function units and operations, for example, a, b and c have a latency of 5, 1, and 1 cycles, respectively. An exemplary modulo schedule is shown in FIG. 2(b), in accordance with one embodiment, where T=2, l=6, and S=3.

As provided in more detail below, in one embodiment, a cell synergistic processor unit (SPU) architecture may be utilized in which vector registers are used to store scalar values in a preferred slot, in addition to their primary role of storing vector values. An exemplary cell SPU processor may be implemented using a single instruction multiple data (SIMD) architecture with 32 bit wide instructions encoding a 3-operand instruction format, for example. SIMD helps achieve data level parallelism, using a vector or array processor.

In one exemplary embodiment, an instruction set architecture (ISA) is implemented that streamlines the instruction side, and provides 7-bit register operand specifiers to preferably directly address 128 registers from one or more instructions using a single pervasive SIMD computation approach for scalar or vector data. In this approach, a unified 128 entry 128 bit SIMD register file may provide scalar, condition and address operands, such as for conditional operations, branches, and memory accesses.

In accordance with one embodiment, the result of a scalar operation in a software pipelined loop may be stored inside an appropriate slot of a vector register. Depending on implementation, the contents of the vector register may be rotated. In this manner, consecutive values of a variable across consecutive iterations of a loop may be stored and rotated efficiently, as provided in more detail below, without inserting many register copy instructions, or unrolling the loop, or relying on costly hardware implementations.

Figure 1:
FIG. 1 illustrates a block diagram of a series of scalar registers allocated to hold values assigned to a variable during various stages of a pipeline.
Figure 1:
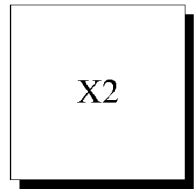
Figure 1:
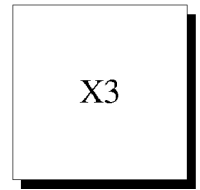
Figure 1:
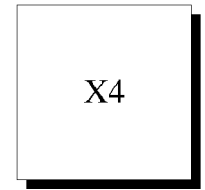
Figure 1:
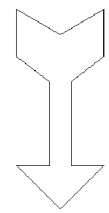
Figure 1:
Figure 1:
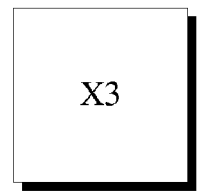
Figure 1:
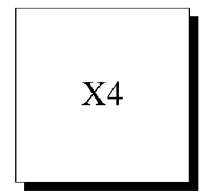
Figure 1:
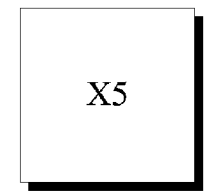
Figure 1:
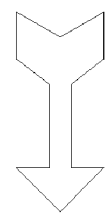
Figure 1:
Figure 1:
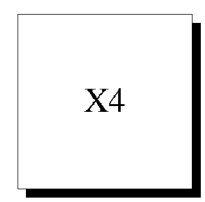
Figure 1:
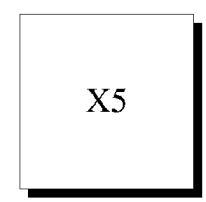
Figure 1:
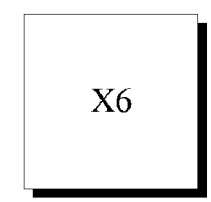
Figure 3:
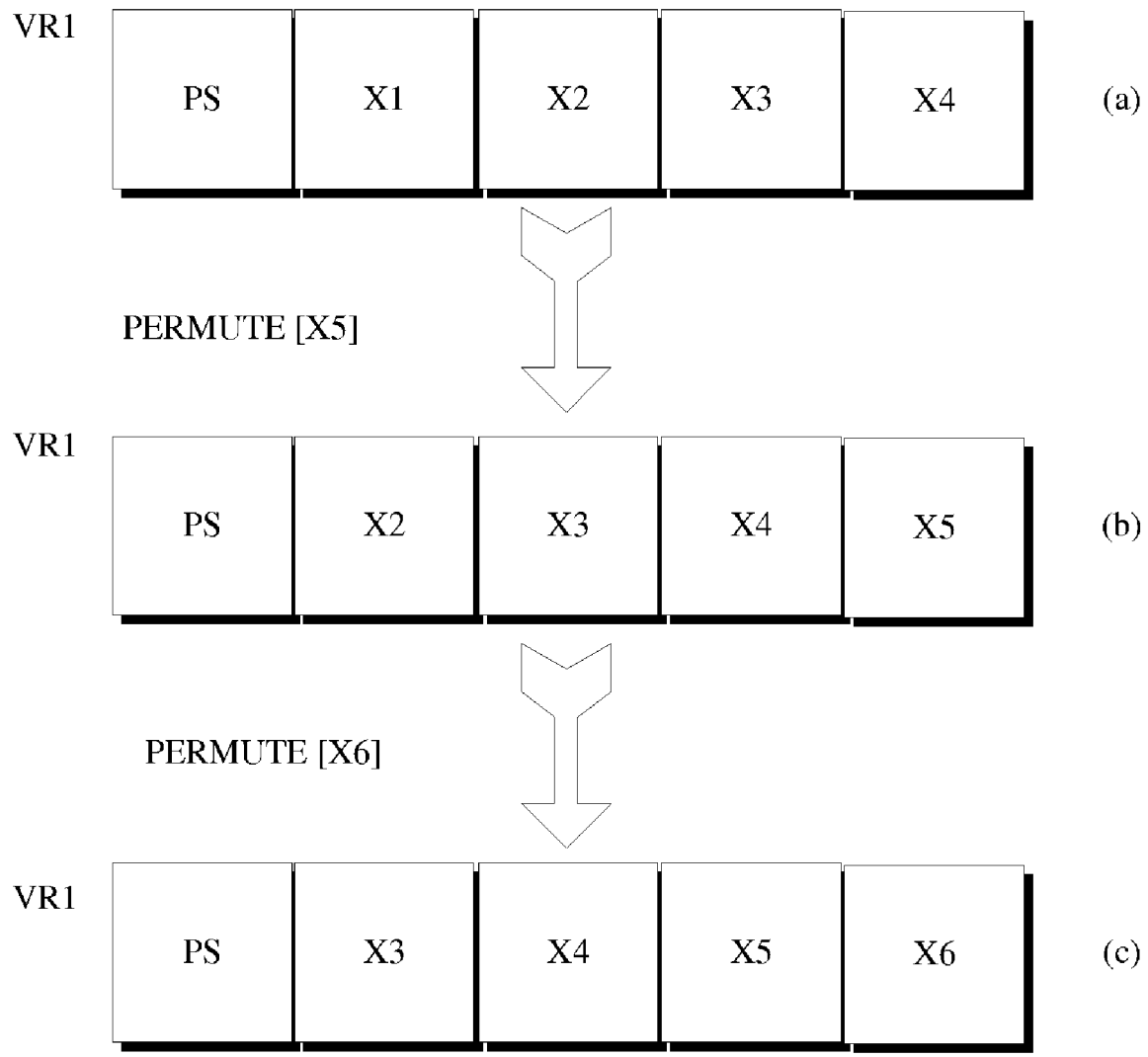
FIG. 3 is a block diagram of a vector register allocated to hold values assigned to a variable during various stages of a pipeline, in accordance with one or more embodiments.

Referring to FIG. 3, in one embodiment, instead of using several scalar registers (e.g., as shown in FIG. 1), at least one vector register VR1 is utilized to store one or more values for X. A vector register is a large register (e.g., 128-256 bits wide) in comparison to a scalar register (e.g., 32-bits) and can be used to hold several values. A vector register may have one or more bits (e.g., the left most bit, or the most significant bit) designated as a preferred slot (PS). The PS may be used to support standard scalar operations operating on single scalar data elements, where SIMD parallelism is not used.

As shown in FIG. 3(a), for example, VR1 may comprise five slots, the left most slot being allocated as the PS and the rest of the slots allocated to various values for a variable X, wherein said values are generated in various pipeline stages during the iteration of a loop. In accordance with one embodiment, a certain instruction (e.g., a permute instruction) can be used to rotate the values among the slots, so that the values X1 through X4 are shifted from right to left, for example, and preferably introduce a new element to the rightmost slot.

In accordance with one embodiment, scalar code using one or more scalar registers or the PS slots of vector registers may be transformed to use additional vacant slots in vector registers, so that when the permute instruction is executed, the values stored in the other slots are shifted/rotated. Thus, in contrast to the related art scalar registers shown in FIG. 1, where execution of at least four sets of instructions (i.e., MOVE, MOVE, MOVE, COPY) is necessary to accomplish the needed rotation, in the exemplary embodiment illustrated in FIG. 3(a) a single permute instruction can accomplish the same.

Advantageously, use of a single associated instruction for a vector register allows the shift in values to be performed during a single execution cycle. Furthermore, the volume of code associated for performing this shift is substantially smaller since execution of a single instruction (instead of multiple instructions) accomplishes the intended result.

As shown in FIGS. 3(a) through 3(c), after execution of the first permute instruction the values stored in VR1 slots are shifted (e.g., from X1, X2, X3, X4 to X2, X3, X4, X5). In one embodiment, the permute instruction accepts a parameter, such that a new value (e.g., X5) can be designated to be stored in the empty slot created when the value stored in the right most slot (e.g., X4) is shifted to the left, for example. As shown in FIGS. 3(b) and 3(c), the values stored in each slot can be shifted each time the permute instruction is executed.

In the foregoing one or more exemplary embodiments are disclosed as applicable to a vector register with four slots and a permute instruction for moving the values stored in each slot to the left. It is noteworthy, however, that the above exemplary embodiments should not be construed as limiting the scope of the invention to said particular implementations. That is, in other embodiments, another type of register having a different number of slots and other associated instruction(s) may be utilized to shift the values in the same or other direction.

In summary, in one or more embodiments, loops amenable to software pipelining that contain scalar variables are identified. For each such loop, the scalar variables which are defined or used inside a loop that have life ranges (LR) longer than the initiation interval (II) of the loop are identified. Where vector size (VS—the number of slots of relevant size in a vector register) is greater than or equal to [LR/II] (where [ ] stands for rounding-up) for every scalar variable, a single vector register is assigned to each scalar variable for holding all its values, provided that there are enough available vector registers.

An associated instruction defining such a scalar variable will rotate the vector register and place the new value at the appropriate position, according to LR/II. In certain embodiments, the rotation and placement can be performed by preferably a single instruction (permute instruction), as provided earlier.

In one embodiment, one or more instructions using such a scalar variable may access the appropriate element. In embodiments that implement a preferred slot (e.g., an embodiment utilizing a Cell Broadband Engine), the oldest element may be positioned at the preferred slot so that instructions accessing it suffer no overhead. In some embodiments, instructions may be utilized that use a single rotate instruction to align the desired data.

In embodiments where [LR/II] is greater than VS, the schedule of the loop may be modified to reduce LR/II (e.g., by increasing II and rescheduling, or backtracking). In some embodiments, more than a single vector register may be assigned to a live range, analogous to the use of multiple scalar registers. Live range refers to the number of cycles starting from the time a value is defined and ending at the time it is last used. Preferably, the value in a designated register is stored for this duration. The latter may increase the demand for vector registers and may involve additional rotate instructions. In certain embodiments, each vector register may hold a LIFO queue (last-in first-out).

The following is an exemplary modulo scheduled loop in accordance with one embodiment:

$$tb^0 = MEM(b, i)$$
$$tc^0 = MEM(c, i)$$
$$tb^1 = MEM(b+4, i)$$
$$tc^1 = MEM(c+4, i)$$
$$tb^2 = MEM(b+8, i)$$
$$tc^2 = MEM(c+8, i)$$
$$\rule{4cm}{0.4pt}$$
$$t = t + tb^0 * tc^0$$
$$tb^0 = tb^1; tb^1 = tb^2; tb^2 = tb^3$$
$$tc^0 = tc^1; tc^1 = tc^2; tc^2 = tc^3$$
$$tb^3 = MEM(b+12, i)$$
$$tc^3 = MEM(b+12, i)$$
$$\rule{4cm}{0.4pt}$$
$$t = t + tb^1 * tc^1$$
$$t = t + tb^2 * tc^2$$
$$t = t + tb^3 * tc^3$$

In the above exemplary process, inside the loop kernel, variables tb and tc are used 3 iterations after they are defined. Vector registers are allocated to these variables to hold the values of these variables across 3 consecutive iterations. The output is a vector-register allocation to variables tb and tc of the following form:

R0=R0+R1 [0]*R2[0]
R3[0]=MEM(b+12, i)
R4[0]=MEM(b+12, i)
R1=R1<<1|R3[0]
R2=R2<<1|R4[0]

If R1 is a vector register holding [e0|e1|e2|e3], then after R1=R1<<1|R3[0] vector register R1 will hold [e1|e2|e3|R3[0]]. R1<<1 will produce [e1|e2|e3|–], and then R3[0] will be placed as the fourth element of R1. This can be accomplished in some embodiment using a single permute instruction.

In different embodiments, the invention can be implemented either entirely in the form of hardware or entirely in the form of software, or a combination of both hardware and software elements. For example, a computing system in accordance with one embodiment may comprise a controlled computing system environment that can be presented largely in terms of hardware components and software code executed to perform processes that achieve the results contemplated by the system of the present invention.

Figure 4:
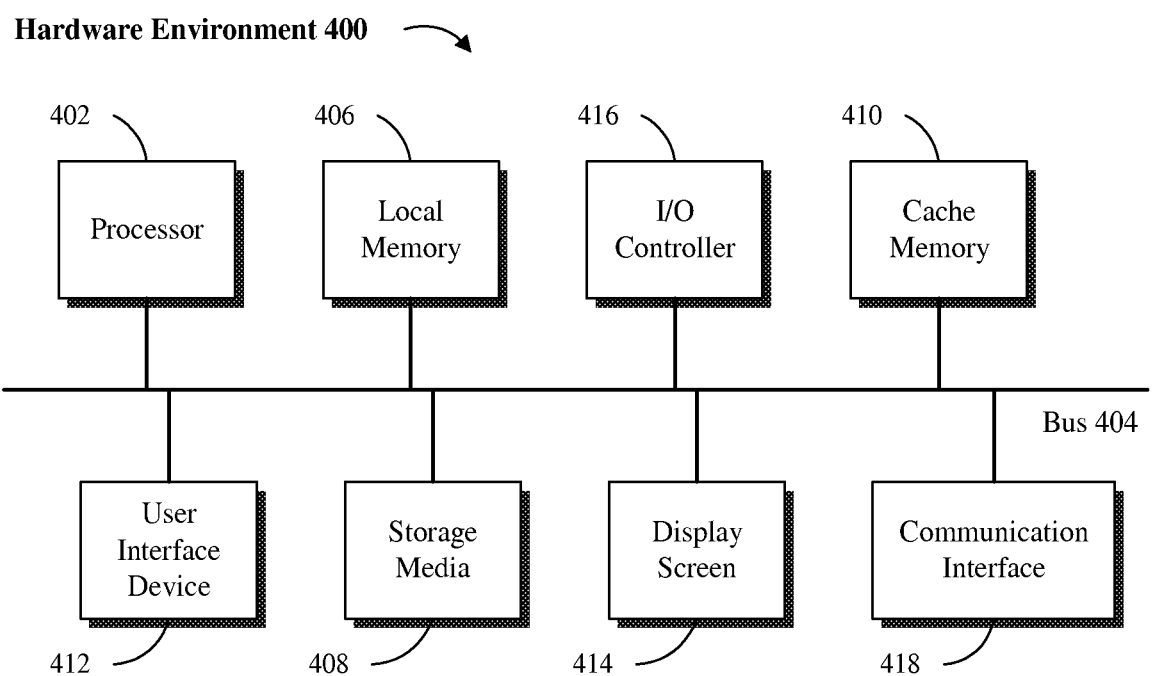
FIGS. 4 and 5 are block diagrams of hardware and software environments in which a system of the present invention may operate, in accordance with one or more embodiments.
Figure 5:
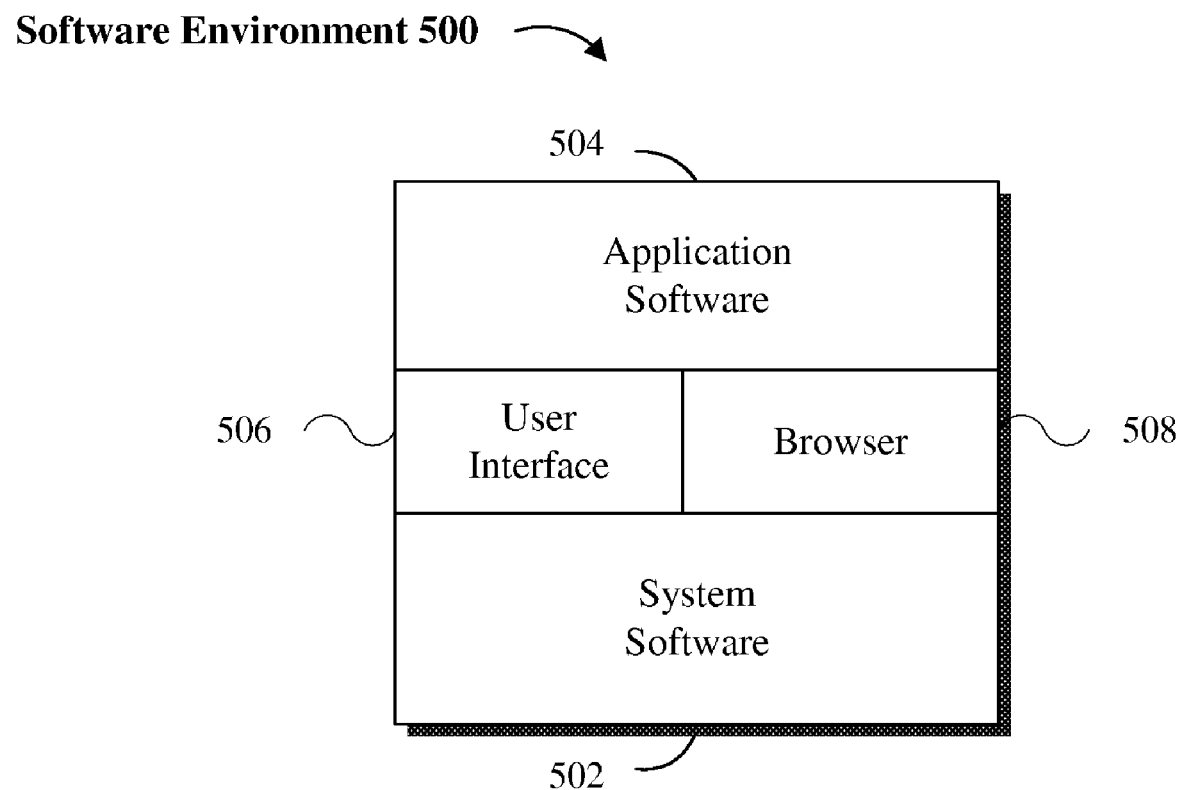

Referring to FIGS. 4 and 5, a computing system environment in accordance with an exemplary embodiment is composed of a hardware environment 400 and a software environment 500. The hardware environment 400 comprises the machinery and equipment that provide an execution environment for the software; and the software provides the execution instructions for the hardware as provided below.

As provided here, the software elements that are executed on the illustrated hardware elements are described in terms of specific logical/functional relationships. It should be noted, however, that the respective methods implemented in software may be also implemented in hardware by way of configured and programmed processors, ASICs (application specific integrated circuits), FPGAs (Field Programmable Gate Arrays) and DSPs (digital signal processors), for example.

Software environment 500 is divided into two major classes comprising system software 502 and application software 504. System software 502 comprises control programs, such as the operating system (OS) and information management systems that instruct the hardware how to function and process information.

In one embodiment, a software pipelining process may be implemented as system software 502 and application software 504 executed on one or more hardware environments. Application software 504 may comprise but is not limited to program code, data structures, firmware, resident software, microcode or any other form of information or routine that may be read, analyzed or executed by a microcontroller.

In an alternative embodiment, the invention may be implemented as computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate or transport the program for use by or in connection with the instruction execution system, apparatus or device.

The computer-readable medium can be an electronic, magnetic, optical, electromagnetic, infrared, or semiconductor system (or apparatus or device) or a propagation medium. Examples of a computer-readable medium include a semiconductor or solid-state memory, magnetic tape, a removable computer diskette, a random access memory (RAM), a read-only memory (ROM), a rigid magnetic disk and an optical disk. Current examples of optical disks include compact disk read only memory (CD-ROM), compact disk read/write (CD-R/W) and digital videodisk (DVD).

Referring to FIG. 4, an embodiment of the system software 502 or application software 504 can be implemented as computer software in the form of computer readable code executed on a data processing system such as hardware environment 400 that comprises a processor 402 coupled to one or more computer readable media or memory elements by way of a system bus 404. The computer readable media or the memory elements, for example, can comprise local memory 406, storage media 408, and cache memory 410. Processor 402 loads executable code from storage media 408 to local memory 406. Cache memory 410 provides temporary storage to reduce the number of times code is loaded from storage media 408 for execution.

A user interface device 412 (e.g., keyboard, pointing device, etc.) and a display screen 414 can be coupled to the computing system either directly or through an intervening I/O controller 416, for example. A communication interface unit 418, such as a network adapter, may be also coupled to the computing system to enable the data processing system to communicate with other data processing systems or remote printers or storage devices through intervening private or public networks. Wired or wireless modems and Ethernet cards are a few of the exemplary types of network adapters.

In one or more embodiments, hardware environment 400 may not include all the above components, or may comprise other components for additional functionality or utility. For example, hardware environment 400 may be a laptop computer or other portable computing device embodied in an embedded system such as a set-top box, a personal data assistant (PDA), a mobile communication unit (e.g., a wireless phone), or other similar hardware platforms that have information processing and/or data storage and communication capabilities.

In certain embodiments of the system, communication interface 418 communicates with other systems by sending and receiving electrical, electromagnetic or optical signals that carry digital data streams representing various types of information including program code. The communication may be established by way of a remote network (e.g., the Internet), or alternatively by way of transmission over a carrier wave.

Referring to FIG. 5, system software 502 and application software 504 can comprise one or more computer programs that are executed on top of operating system 112 after being loaded from storage media 408 into local memory 406. In a client-server architecture, application software 504 may comprise client software and server software. For example, in one embodiment of the invention, client software is executed on computing systems 110 or 120 and server software is executed on a server system (not shown).

Software environment 500 may also comprise browser software 508 for accessing data available over local or remote computing networks. Further, software environment 500 may comprise a user interface 506 (e.g., a Graphical User Interface (GUI)) for receiving user commands and data. Please note that the hardware and software architectures and environments described above are for purposes of example, and one or more embodiments of the invention may be implemented over any type of system architecture or processing environment.

It should also be understood that the logic code, programs, modules, processes, methods and the order in which the respective steps of each method are performed are purely exemplary. Depending on implementations, the steps may be performed in any order or in parallel, unless indicated other in the present disclosure. Further, the logic code is not related, or limited to any particular programming related, or limited to any particular programming language, and may comprise of one or more modules that execute on one or more processors in a distributed, non-distributed or multiprocessing environment.

Therefore, it should be understood that the invention can be practiced with modification and alteration within the spirit and scope of the appended claims, The description is not intended to be exhaustive or to limit the invention to the precise form disclosed. These and various other adaptions and combinations of the embodiments disclosed are within the scope of the invention and are further defined by the claims and their full scope of equivalents.

What is claimed is:

1. A method implemented for execution on a machine, the method comprising:

processing multiple values assigned to a single variable during various stages of a software pipeline, wherein in the software pipeline, order of execution of instructions in a logical loop in a program code is modified so that independent instructions are executed in parallel on multiple processors;

storing in a first slot in a vector register, a first value assigned to a first variable, during a first stage of the software pipeline;

storing in a second slot in the vector register, a second value assigned to the first variable, during a second stage of the software pipeline;

storing in a third slot in the vector register, an instruction applicable to said at least first value and the second value, such that execution of the instruction during a single processing cycle of the software pipeline, results in rotating of values stored in one or more slots of the vector register, so that the second value assigned to the first variable is moved from the second slot into the first slot, and wherein the rotating of the values stored in the slots of the vector register takes place during a single execution cycle.

2. The method of claim 1, wherein the first slot is adjacent to the second slot.

3. The method of claim 1, further comprising storing a new value in a slot of the vector register, when an old value in said slot is moved to another slot, in response to the rotating.

4. The method of claim 3, wherein storing the new value in said slot and the rotating of values in each slot takes place responsive to a single instruction.

5. The method of claim 1, wherein a modulo-scheduling scheme is applied to the software pipeline.

6. A system comprising:
- one or more processors for processing multiple values assigned to a single variable during various stages of a software pipeline wherein in the software pipeline, order of execution of instructions in a logical loop in a program code is modified so that independent instructions are executed in parallel on multiple processors;
- a logic unit for storing in a first slot in a vector register, a first value assigned to a first variable, during a first stage of the software pipeline;
- a logic unit for storing in a second slot in the vector register, a second value assigned to the first variable, during a second stage of the software pipeline;
- a logic unit for storing in a third slot in the vector register, an instruction applicable to said at least first value and the second value, such that execution of the instruction during a single processing cycle of the software pipeline, results in rotating of values stored in one or more slots of the vector register, so that the second value assigned to the first variable is moved from the second slot into the first slot; and
- wherein the rotating of the values stored in the slots of the vector register takes place during a single execution cycle.

7. The system of claim 6, wherein the first slot is adjacent to the second slot.

8. The system of claim 6, further comprising storing a new value in a slot of the vector register, when an old value in said slot is moved to another slot, in response to the rotating.

9. The system of claim 8, wherein storing the new value in said slot and the rotating of values in each slot takes place responsive to a single instruction.

10. The system of claim 6, wherein a modulo-scheduling scheme is applied to the software pipeline.

11. A computer program product comprising logic code stored on a non-transitory data storage medium, wherein execution of the logic code on a computer causes the computer to:
- process multiple values assigned to a single variable during various stages of a software pipeline wherein in the software pipeline, order of execution of instructions in a logical loop in a program code is modified so that independent instructions are executed in parallel on multiple processors;
- store in a first slot in a vector register, a first value assigned to a first variable, during a first stage of the software pipeline;
- store in a second slot in the vector register, a second value assigned to the first variable, during a second stage of the software pipeline;
- store in a third slot in the vector register, an instruction applicable to said at least first value and the second value, such that execution of the instruction during a single processing cycle of the software pipeline, results in rotating of values stored in one or more slots of the vector register, so that the second value assigned to the first variable is moved from the second slot into the first slot, and
- wherein the rotating of the values stored in the slots of the vector register takes place during a single execution cycle.

12. The computer program product of claim 11, wherein the first slot is adjacent to the second slot.

13. The computer program product of claim 11, further comprising storing a new value in a slot of the vector register, when an old value in said slot is moved to another slot, in response to the rotating.

14. The computer program product of claim 13, wherein storing the new value in said slot and the rotating of values in each slot takes place responsive to a single instruction.

15. The computer program product of claim 11, wherein a modulo-scheduling scheme is applied to the software pipeline.

* * * * *